United States Patent
Park et al.

(10) Patent No.: US 8,335,289 B2
(45) Date of Patent: Dec. 18, 2012

(54) APPARATUS AND METHOD FOR DETECTING IMPULSE SIGNAL AND IMPULSE SEQUENCE

(75) Inventors: Young Jin Park, Anyang-si (KR); Soon Woo Lee, Anyang-si (KR); Ji Myung Kang, Ansan-si (KR); Kwan Ho Kim, Seoul (KR)

(73) Assignee: Korea Electrotechnology Research Institute, Changwon-Si (KR)

( * ) Notice: Subject to any disclaimer, the term of this patent is extended or adjusted under 35 U.S.C. 154(b) by 358 days.

(21) Appl. No.: 12/760,812

(22) Filed: Apr. 15, 2010

(65) Prior Publication Data

US 2011/0142174 A1    Jun. 16, 2011

(30) Foreign Application Priority Data

Dec. 15, 2009    (KR) .......................... 10-2009-0124951

(51) Int. Cl.
    *H04L 27/06* (2006.01)
(52) U.S. Cl. ...................................... 375/354
(58) Field of Classification Search .................. 375/343, 375/354, 355, 340, 256; 370/503; 340/8.1, 340/10.1
    See application file for complete search history.

(56) References Cited

U.S. PATENT DOCUMENTS

| | | | |
|---|---|---|---|
| 2005/0018762 A1* | 1/2005 | Aiello et al. | 375/219 |
| 2006/0238301 A1* | 10/2006 | Wu et al. | 340/10.1 |
| 2008/0056419 A1* | 3/2008 | Lee et al. | 375/355 |
| 2009/0225786 A1* | 9/2009 | Wen et al. | 370/498 |
| 2010/0109844 A1* | 5/2010 | Carrick et al. | 340/10.1 |
| 2010/0295731 A1* | 11/2010 | Chong et al. | 342/387 |

OTHER PUBLICATIONS

Soon-Woo Lee, Young-Jin Park and Kwan-Ho Kim, "Design and Implementation of Energy-Collection-Based Low Complexity IR-UWB Receiver", IEICE, Feb. 2008.*
Shaohua Wu, Qinyu Zhang and Naitong Zhang, "A Two-step TOA Estimation Method for IR-UWB Ranging Systems", Harbin Institute of Technology, IEEE, 2007.*
David Barras, Robert Meyer-Piening, George von Bueren, Walter Hirt and Heinz Jaeckel, A Low-Power Baseband ASIC for an Energy-Collection IR-UWB Receiver, IEEE, Jun. 2009.*
Marian Verhelst, Julien Ryckaert, Yves Vanderperren and Wim Dehaene, "A low power, reconfigurable IR-UWB system", MICAS-ESAT-Katholieke Universiteit Leuven, Belgium, IEEE, 2008.*
Rongrong Zhang and Xiaodai Dong, "A New Time of Arrival Estimation Method Using UWB Dual Pulse Signals", University of Victoria, Canada, IEEE, Jun. 2008.*

* cited by examiner

*Primary Examiner* — Aristocratis Fotakis (57) ABSTRACT

Disclosed herein is an apparatus and method for detecting an impulse signal or impulse sequence to realize wireless real-time location system application in a multipath fading environment. The apparatus includes a band-pass filter, an RF analog unit, and a signal processing base-band unit. The band-pass filter removes unnecessary frequency bands from impulse signals received through a receiving antenna. The RF analog unit detects the envelope of the impulse sequence deprived of the unnecessary frequency bands and based on a multipath, and outputs a digital signal regarding the envelope based on a leading edge of the envelope. The signal processing base-band unit performs low-speed 1-bit sampling and then output data, and, if frame synchronization has been found or a ranging command has been detected, performs high-speed 1-bit sampling and then calculates and outputs the propagation time of the impulse signals.

18 Claims, 11 Drawing Sheets

| Preamble (20Byte) | Frame Info.(8Byte) | Ranging Info.(2Byte) | Ranging Pulse(1Byte) |

FIG. 9A

| TEST ENVIRONMENT | INDOOR CONFERENCE ROOM(9 x 11m) |
|---|---|
| USABLE FREQUENCY BAND | 3.1 ~ 4.9 GHz |
| LOCATION METHOD | TDOA |
| MODULATION METHOD | On-off-keying |
| LOCATION RESOLUTION | EQUAL TO OR LESS THAN 15cm |
| RANGING SAMPLING | 1Gsps |
| PULSE REPETITION FREQUENCY | 1μs |
| MAC(MEDIUM ACCESS CONTROL) | Aloha, CRC |

FIG. 9B

APPARATUS AND METHOD FOR DETECTING IMPULSE SIGNAL AND IMPULSE SEQUENCE

BACKGROUND OF THE INVENTION

1. Field of the Invention

The present invention relates generally to an impulse signal detection apparatus and a wireless ranging method using the impulse signal detection apparatus, and, more particularly, to an impulse signal detection apparatus and method which enables a wireless real-time location system application in an indoor/outdoor multipath fading environment by using an ultra-short impulse signal.

2. Description of the Related Art

In general, wireless real-time location technology enables the location (tracking) of humans, animals and objects, the management of patients in a hospital, and the management of expensive equipment to be performed in real time, so that systems have been implemented using a variety of types of methods such as ZigBee, and a Wireless Local Area Network (WLAN).

However, since it is very difficult to achieve as a good precision as tens of centimeters in an environment of multipath fading, interest in the development of wireless real-time location technology using an impulse radio ultra wideband signal, which is a new wireless method, is growing.

Impulse radio ultra wideband (IR-UWB) wireless technology is designed to use an impulse waveform. With regard to this, U.S. Federal Communications Commission (FCC) permitted the use of a frequency band for ultra-wideband wireless technology in February 2002, and in Europe, Japan and Korea, frequency bands for related technology are allocated.

Meanwhile, an impulse signal has a signal bandwidth equal to or wider than hundreds of MHz in the frequency domain, and has a pulse width equal to or narrower than a nano second ($10^{-9}$ sec), which is much narrower than the repetitive period of a pulse, in the time domain. Accordingly, an impulse signal has excellent temporal precision characteristics and, therefore, may be used for precise ranging. In particular, in August 2007, the IEEE 802.15.4A standardization group announced a de facto international standard for short distance data communication technology having an impulse signal-based low-speed, low-power, low-complexity wireless location function, and many efforts to develop related technologies have been made throughout the world. Furthermore, the International Organization for Standardization (ISO)/International Electrotechnical Commission (IEC), which are international standard organizations, are establishing standards for impulse signal ultra-wideband technology-based real-time location system (RTLS).

Conventional technologies corresponding to the impulse signal ultra-wideband technology-based real-time location technology will be described below.

U.S. Pat. No. 5,510,800 (entitled "Time-of-Flight Radio Location System") issued to the Regents of the University of California on Apr. 23, 1996 discloses a system capable of measuring a very accurate location by detecting the location of a first arriving pulse by applying an RF impulse to a structure in which transmission and reception are separated from each other. That is, the system uses a method of capturing a first arranging pulse using a peak detector. However, in the case of a multipath fading environment, impulses are gathered together and then input due to a multipath, and the selection of an accurate threshold level is difficult because the size of the closest line-of-sight is much less than the magnitude of overlapping of multipath fading signals. That is, it is impossible to use the first pulse detection method using a peak detector.

U.S. Pat. No. 6,882,315 (entitled "Object Location System and Method") issued to Mutispectral Solutions, Inc. on Apr. 19, 2005 discloses a location system using an impulse UWB signal. That is, a method in which a reference transmitter is added in a multipath fading environment and the synchronization between transmitters and a direct path in a multipath fading environment are found is disclosed. However, there is no description of a method of finding a pulse. In particular, there is no description of a method of directly finding a pulse in a multipath fading environment.

U.S. Pat. No. 6,133,876 (entitled "System and Method for Position Determination by Impulse Radio") issued to Time Domain Corporation proposes an idea for precisely measuring distance using an impulse signal. That is, distance is measured using the difference in impulse propagation time between a transmitter and a receiver. In order to perform reception, a correlator is used. However, this ranging method has the disadvantage of requiring an existing mixer and the disadvantage of needing to know the accurate timing and the information of a received pulse.

The paper "Ranging in a Dense Multipath Environment using a UWB Radio Link" published on December 2002 in the IEEE Journal on selected areas in communications, VOl. 20, No. 9 by Joon-Yong Lee and Robert A. Scholtz proposes an algorithm for detecting a rectilinear path signal. Although a mixer and a high-speed sampler are used to implement the above structure, this increases the complexity and cost of the system.

Furthermore, the paper "Experimental Investigation of an IR-UWB Positioning System with Comparators" published on November 2007 in the IEICE Trans. Fundamentals Vol. E90-A, No. 11 by Koichi KITAMURA and Yukitoshi SANADA proposes a structure in which a high-speed comparator is used to detect an impulse signal. The proposed structure digitizes received impulses in a multipath fading environment using a high-speed comparator, and symbols are detected from the digitized signal by a signal processing unit using a correlator. However, this proposed structure has an advantage in that in a multipath fading environment, the interval of a received pulse is long, so that ranging errors may be increased.

Furthermore, the paper "A Low-complexity Noncoherent IR-UWB Transceiver Architecture with TOA Estimation" published on April 2006 in the IEEE Trans. on Microwave Theory and Techniques, VOL. 54, No. 4 by Lucian Stoica and Alberto Rabbachin and Ian Oppermann discloses a scheme for finding the greatest output by integrating a received impulse signal with respect to a single transmission pulse using an integrator having a parallel structure. However, there are disadvantages in that a plurality of integrators is required to implement the above method and power consumption is increased by these integrators.

As described above, although the impulse signal wireless technology provides very excellent resolution, a low-complexity, low-cost technology for detecting the precise timing of an impulse signal in a multipath fading environment has not been proposed.

SUMMARY OF THE INVENTION

Accordingly, the present invention has been made keeping in mind the above problems occurring in the prior art, and an object of the present invention is to provide an apparatus for detecting an impulse signal and an impulse sequence which enables wireless real-time location system applications in a multipath fading environment.

Another object of the present invention is to provide a method of detecting an impulse signal using the apparatus for detecting an impulse signal and a ranging method using the method of detecting an impulse signal.

In order to accomplish the above object, the present invention provides an apparatus for detecting an impulse signal to realize wireless real-time location system application in a multipath fading environment, including a band-pass filter for removing unnecessary frequency bands from ultra-short impulse signals received through a receiving antenna; an RF analog unit for detecting an envelope of the impulse sequence deprived of the unnecessary frequency bands and based on a multipath, and outputting a digital signal regarding the envelope based on a leading edge of the envelope; and a signal processing base-band unit for performing low-speed 1-bit sampling and then outputting data, and, if frame synchronization has been found or a ranging command has been detected, performing high-speed 1-bit sampling and then calculating and outputting propagation time of the impulse signals.

The RF analog unit includes a low-noise amplifier for amplifying the impulse sequence received in an multipath fading environment; an envelope detector for detecting an envelope signal from the amplified impulse sequence; a variable wide band gain amplifier for amplifying the envelope signal; and a comparator for detecting a leading edge of the amplified envelope signal and converting a pulse signal into a digital square pulse.

The comparator compares the amplified envelope signal with a reference voltage and then outputs a digital signal regarding part of the envelope signal above the reference voltage. The reference voltage is variable.

The comparator includes a plurality of comparators having different reference voltages between a minimum voltage and a maximum voltage, and the plurality of comparator compares the amplified envelope signal with the corresponding reference voltages and outputs a digital signal regarding the amplified envelope signal; and, if the plurality of comparators does not output the digital signal when the amplified envelope signal is lower than the minimum voltage or higher than the maximum voltage, amplification factors of the low-noise amplifier and the variable gain amplifier are adjusted using predetermined control means.

The apparatus further includes an integrator disposed between the variable gain amplifier and the comparator. The integrator removes impulse-type noise and performs signal amplification.

The signal processing base-band unit includes a low-speed signal processing unit for detecting presence of a digital pulse; and a high-speed signal processing unit for detecting detection timing of the digital pulse.

The low-speed signal processing unit includes a low-speed sampler for sampling the digital signal at low speed; a symbol synchronizer for synchronizing symbols of the digital signal sampled by the low-speed sampler; and a frame synchronizer for synchronizing the symbols synchronized by the symbol synchronizer for each frame and then detecting the presence of the digital pulse.

The high-speed signal processing unit includes a high-speed sampler for sampling the digital signal in response to a frame synchronization signal provided by the frame synchronizer; and a ranging pulse detector for detecting a ranging pulse from the pulses sampled by the high-speed sampler.

The high-speed sampler includes a clock signal divider for dividing a predetermined clock signal provided from an outside; a flip-flop for receiving pulses from the RF/analog unit, and outputting pulses in synchronization with clock signals provided by the clock signal divider; a register for outputting pulses out of the flip-flop; and a parallel signal processor for, in response to the clock signals output from the clock signal divider, sampling the pulse signals provided by the register and then detecting the ranging pulse.

The register receives the pulses from the flip-flop in a serial manner, and outputs pulses in a parallel manner.

According to another aspect of the present invention, there is provided a method of detecting an impulse signal to realize wireless real-time location system application in a multipath fading environment, including checking whether an impulse signal has been received, and, if the impulse signal has been received, removing unnecessary frequency bands therefrom; amplifying an impulse sequence deprived of the unnecessary frequency bands; detecting and amplifying an envelop of the amplified impulse sequence; detecting a leading edge of the envelope signal and converting information about the leading edge into a digital signal; detecting a start of the digital signal using low-speed sampling; and, if a ranging command has been detected or frame synchronization has been found, calculating a propagation time of the impulse signals using high-speed sampling.

The method further includes detecting and then amplifying the envelope and stopping high-frequency components of the envelope signal.

The method further includes measuring an absolute delay time between arrival time of the impulse signal and detection time of the digital signal using temporal calibration based on a Time of Arrival (TOA) or Time Difference of Arrival (TDOA) method, and calculating the distance to a location where the impulse signal occurred. The temporal calibration is performed periodically.

The temporal calibration based on a TOA method is performed by receiving impulses from a tag at a predetermined distance using a reader, and calculating the propagation distance of the impulse signal using the following equation:

$$D_{mea\_toa} = (T_{mea\_toa} - T_{cal\_toa}) \times c/2 + D_{cal\_toa}, (c=3\times10^8 \text{ m/sec}) \quad (1)$$

where $T_{cal\_toa}$ is impulse round-trip time between the tag and the reader during calibration, $D_{cal\_toa}$ is distance between the tag and the reader during calibration, and $T_{mea\_toa}$ is actually measured impulse round-trip time between the tag and the reader.

The temporal calibration based on a TDOA method is performed by receiving impulses from a tag at the middle of two readers using first and second readers, and calculating $D_{mea\_tdoa1}$ (propagation distance from the tag to the first reader) and $D_{mea\_tdoa2}$ (propagation distance from the tag to the second reader) using the following Equations:

$$D_{mea\_tdoa1} = (D_{cal\_total} + \Delta D_{mea\_tdoa})/2$$

$$D_{mea\_tdoa2} = (D_{cal\_total} - \Delta D_{mea\_tdoa})/2$$

$$\Delta D_{mea\_tdoa} = D_{mea\_tdoa1} - D_{mea\_tdoa2} = (\Delta T_{cal\_tdoa} + (T_{mea\_tdoa1} - T_{mea\_tdoa2})) \times c, (c=3\times10^8 \text{ msec})$$

$$D_{cal\_total} = D_{mea\_tdoa1} + D_{mea\_tdoa2}$$

where $\Delta T_{cal\_tdoa}$ is a difference in absolute time between the arrival time of the impulse from the tag to the first reader and the arrival time of the impulse from the tag to the second reader during calibration, $D_{cal\_total}$ is distance between the first and second readers during calibration, $T_{mea\_tdoa1}$ is time when the first reader detects the impulse from the tag, $T_{mea\_tdoa2}$ is time when the second reader detects the impulse from the tag, $D_{mea\_tdoa1}$ is distance between the tag to the first reader, and $D_{mea\_tdoa2}$ is distance from the tag to the second reader.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 1:
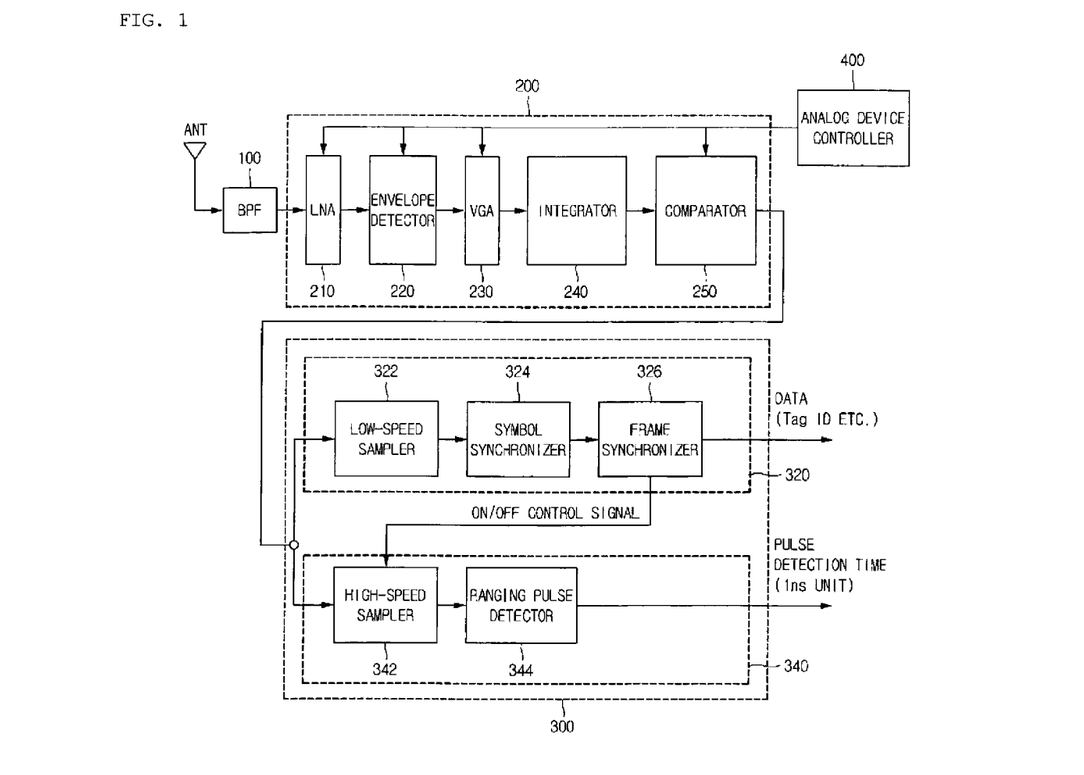
FIG. 1 is a block diagram illustrating an apparatus for detecting an impulse signal according to an embodiment of the present invention.

FIG. 1 is a block diagram illustrating an apparatus for detecting an impulse signal according to an embodiment of the present invention. In particular, this drawing shows the configuration of the reception unit of a low-complexity ultra-wideband impulse signal-based wireless real-time location system.

Referring to FIG. 1, the apparatus for detecting an impulse signal according to an embodiment of the present invention includes a band-pass filter 100, a Radio Frequency (RF) analog unit 200, and a signal processing base-band unit 300.

The band-pass filter 100 removes unnecessary frequency bands from an ultra-short impulse signal received through a receiving antenna ANT, and provides it to the RF/analog unit 200.

The RF/analog unit 200 includes a low-noise amplifier 210, an envelope detector 220, a variable gain amplifier 230, an integrator 240 and a comparator 250, and converts an impulse sequence, from which the unnecessary frequency bands have been removed by the band-pass filter 100, into a digital signal, and provides it to the signal processing base-band unit 300. The RF/analog unit 200 is controlled in response to an I2C block provided by an analog device controller 400.

The low-noise amplifier 210 amplifies the impulse sequence, from which unnecessary frequency bands have been removed by the band-pass filter 100, and provides the amplified impulse sequence to the envelope detector 220. The envelope detector 220 detects an envelope signal from the amplified impulse sequence. The variable gain amplifier 230 amplifies the detected envelope signal.

The integrator 240 stops the high-frequency components of the amplified envelope signal and passes the low-frequency components thereof, and provides a resulting signal to the comparator 250. The integrator 240 removes impulse-type noise, may amplify the size of a signal in accordance with a predetermined signal gain, and makes the duration of the amplified envelope signal wider.

Although in the present embodiment, the integrator is described as being used between the variable gain amplifier 230 and the comparator 250 so as to improve the noise characteristics of an envelope signal, the integrator may be omitted.

The comparator 250 detects the leading edge of the amplified envelope signal input from the variable gain amplifier 230 or integrator 240, compares the envelope signal with a reference voltage, converts part of the envelope signal above the reference voltage into a digital signal (or square pulse), and provides the digital signal to the signal processing base-band unit 300. If the level of the input signal envelope signal is low, the comparator 250 may increase the amplification factor (gain) of the low-noise amplifier 210 and the amplification factor (gain) of the variable gain amplifier 230 using predetermined control means. Furthermore, the reference voltage of the comparator 250 may be varied using predetermined control means. Here, the reference voltage of the comparator 250 may be proportional to the amplification factor of the low-noise amplifier 210 and the amplification factor of the variable gain amplifier 230.

The signal processing base-band unit 300 includes a low-speed signal processing unit 320 and a high-speed signal processing unit 340, and performs low-speed 1-bit sampling (equal to or lower than 200 Msps) and then outputs data, and, if frame synchronization has been found or a ranging command has been detected in a frame packet, performs high-speed 1-bit sampling and then calculates and outputs the propagation time of the impulse signal.

The low-speed signal processing unit 320 includes a low-speed sampler 322, a symbol synchronizer 324, and a frame synchronizer 326, and detects only the presence of the resulting digital pulse. It is possible to detect the presence of such a digital pulse, restore symbols, and acquire packet (or frame) information. Furthermore, it is possible to acquire information about the performance of ranging.

First, in the low-speed signal processing unit 320, the low-speed sampler 322 performs about 60 MHz 1-bit low-speed sampling, the symbol synchronizer 324 restores the data of a packet, and the frame synchronizer 326 extracts ranging performance information, such as a tag ID, from a packet.

Furthermore, the low-speed signal processing unit 320 notifies the high-speed signal processing unit 340 of a ranging pulse interval in a packet, so that high-speed pulse detection for wireless location can be performed.

The high-speed signal processing unit 340 includes a 1-bit high-speed sampler 342 and a ranging pulse detector 344, and detects the accurate timing of a digital pulse to perform ranging. Since the detection of about tens of nanosecond pulse is sufficient to restore information, a low-speed clock is used compared to that for ranging in which the accurate location of a pulse must be detected. However, when ranging is necessary, the accurate start of a pulse is searched for using a high-speed clock and therefore ranging can be enabled, thereby reducing the complexity of the signal processing base-band unit 300.

That is, since the high-speed signal processing unit 340 operates in a ranging pulse detection interval, power consumption can be decreased and the maintenance cost of the system can be reduced. When a ranging pulse is detected by the 1-bit high-speed sampler 342, the detection time is recorded, and the detection time together with the ranging information is sent to a wireless location server (not shown). The pulse signal sampling period of the high-speed signal processing unit 340 is 1 ns (1 Gsps), and is a period for which a radio wave moves about 30 cm. Therefore, the location resolution of the fabricated wireless location system becomes about 30 cm or less.

Figure 2:
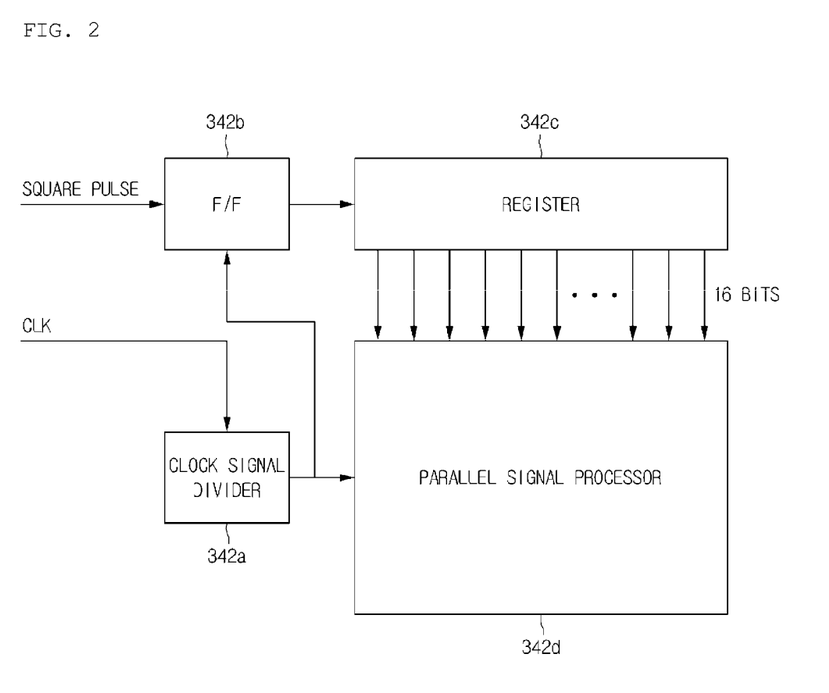
FIG. 2 is a block diagram illustrating a high-speed sampler for high-speed digital sampling which is an element of the signal processing base-band unit of FIG. 1.

FIG. 2 is a block diagram illustrating a high-speed sampler for high-speed digital sampling which is an element of the signal processing base-band unit of FIG. 1.

As shown in FIG. 2, the 1-bit high-speed sampler 342 divides 1 Gsps data by 16 and performs operation thereon in response to an ON/OFF control signal provided by the frame synchronizer 326.

The clock signal divider 342a divides an externally provided 1 GHz clock signal CLK by 16, and provides it to the flip-flop 342b and the parallel signal processor 342d.

The flip-flop 342b receives a pulse from the comparator 250 of the RF/analog unit 200, and outputs the pulse to the register 342c in synchronization with the clock signal divided by 16 and provided by the clock signal divider 342a.

The register 342c provides the pulse signal provided by the flip-flop 342b in serial form to the parallel signal processor 342d. In the present embodiment, the register 342c is a 16 Serial-In Parallel-Out (SIPO) register which outputs a pulse signal, input in serial form, via 16 output channels in a parallel manner.

The parallel signal processor 342d performs sampling on pulse signals provided by the register 342c in response to the clock signal divided by 16.

As described above, the signal processing base-band unit 300 functions to receive output signals from the comparator 250 and record pulse reception times in nanoseconds so as to restore data (identifier information, etc.) and calculate a precise pulse delay time. To reduce the complexity and cost of the wireless location system, the signal processing base-band unit 300 is divided into a low-speed signal processing unit 320 for performing data demodulation and a high-speed signal processing unit 340 for detecting a low-speed ranging pulse, and realizes a low-complexity, low-power, low-cost system by using a 1 GHz high-speed clock without using a high-resolution, high-speed, complicated analog-digital converter (ADC).

Figure 3:
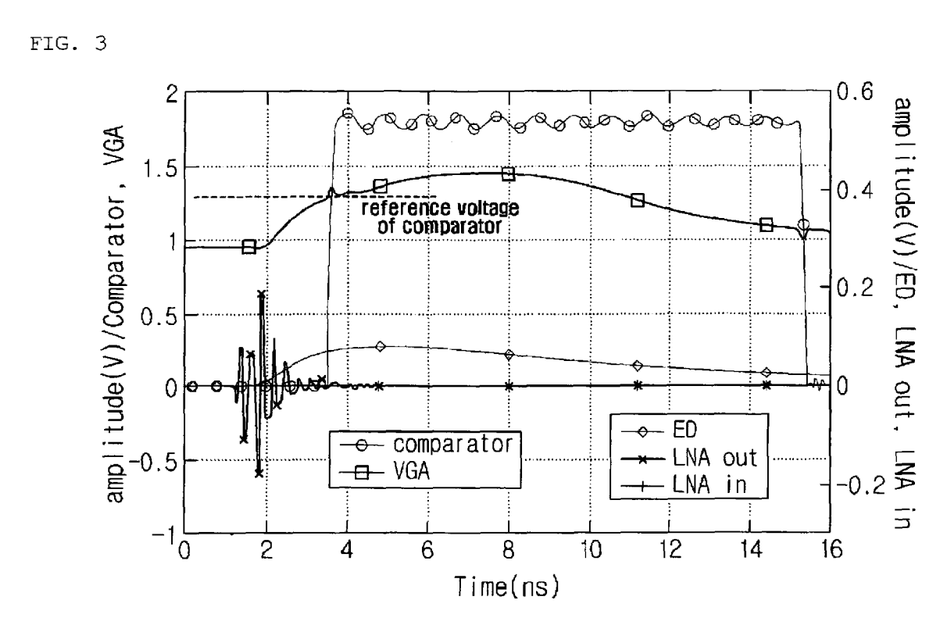
FIG. 3 is a graph showing an example of simulation output illustrating the functions of elements provided in the RF/analog unit of FIG. 1 with respect to a single pulse input.

FIG. 3 is a graph showing an example of simulation output illustrating the functions of elements provided in the RF/analog unit 200 of FIG. 1 with respect to a single pulse input. In the present embodiment, an RF integrated circuit simulation tool is used to perform simulation.

In FIG. 3, the left Y-axis values are the results of the comparator 250 and the variable gain amplifier 230, and the right Y-axis values are the input LNA in of the low-noise amplifier 210, the output LNA out of the low-noise amplifier 210, and the output ED (Envelope Detection) of the envelope detector 220.

Since a signal present before amplification is much smaller than an amplified signal, the former signal seems to be a rectilinear line. As seen from FIG. 3, the envelope ED is detected by the envelope detector 220 and amplification is performed by the variable gain amplifier 230. The detected envelope is not the accurate envelope of the amplified impulse signal, and has a slope more moderate than that of an actual pulse envelope.

However, the rising interval of the detected pulse signal is equal to or less than about 2 ns, based on which the actual envelope signal frequency band is equal to or wider than hundreds of MHz. With regard to the detected envelope signal, the start of the input impulse signal sequence can be easily identified by amplifying the first arriving pulse having a signal of low magnitude and the magnitude of the envelope of the pulse sequence received through a multipath using the variable gain amplifier 230. A variable gain-amplified signal has a DC offset at a specific level so that it can be input to the comparator 250.

To perform-variable gain amplification, the peak value of a received signal is generally detected. However, since the bandwidth of the envelope detected signal is equal to or wider than hundreds of MHz and a high-resolution high-speed Analog-Digital Converter (ADC) must be used to find a peak value, the complexity of the system increases and power consumption and cost increase in a geometrical progression. However, according to the present invention, the peak value of a detected envelope is not found and the comparator 250 can detect a digital signal for the envelope signal by comparison with a triggering level (reference voltage).

That is, in order to enable an amplified signal to be restored to a digital signal using the variable gain amplifier 230 through the comparator 250, the comparator 250 has two input signals in the present embodiment. One input is the output signal of the variable gain amplifier 230 having DC offset, and the other is a reference signal (a triggering level) which is used for comparison with the output signal of the variable gain amplifier VGA 230. The comparator 250 outputs a digital signal with respect to an input signal (amplified envelope signal) equal to or higher than a reference voltage. The reference voltage and the amplification factor of the variable gain amplifier 230 may be adjusted such that the width of a restored digital signal is greater than 10 ns and less than tens of ns. These values correspond to the case where the level of the reference voltage signal of the comparator 250 is equal to or less than ½ of a peak value.

Here, a plurality of comparators 250 having different triggering levels (reference voltages) may be provided. Although in FIG. 1, the comparator 250 is illustrated as being one in number, a plurality of comparators 250 may be provided and different reference voltages may be set for the respective comparators. For example, respective comparative voltages set for the plurality of comparators 250 may be previously determined between the maximum voltage and the minimum voltage. Here, each comparator may compare a corresponding reference voltage with an envelope signal, and convert part of the envelope signal above the corresponding reference voltage into a digital signal (or a square pulse). In this case, the output of any one comparator for outputting a digital signal may be provided to the signal processing base-band unit 300. If all of the plurality of comparators 250 cannot output a digital signal, that is, if the input envelope signal is equal to or lower than the minimum voltage or equal to or greater than the maximum voltage, the amplification factor of the low-noise amplifier 210 and an amplification factor related to the gain conversion of the variable gain amplifier 230 may be adjusted using predetermined control means.

Meanwhile, FIG. 3 shows the locations of received pulses detected using the comparator 250 of FIG. 1. It can be seen that the location of the leading edge of a digital signal is delayed by a specific period compared to a first impulse signal. According to the embodiment of the present invention, the accurate location of a first arriving pulse is not detected, and the start of an impulse signal is found using an envelope. That is, the leading edge of the envelope of impulse signals is found using the comparator 250.

As illustrated in FIG. 3, the location of a detected pulse has a predetermined temporal interval with respect to the time when a first pulse arrives. The temporal interval between the peak value of the first arriving pulse and the triggering detection signal may vary within a range equal to or greater than hundreds of pico ($10^{-12}$) seconds depending on a voltage level used to trigger the output signal of the amplifier.

Meanwhile, the difference between the first arriving time of an impulse sequence and the digital signal detection time of the comparator 250 may be corrected by temporal calibration while a measuring process is being carried out. That is, the actual distance from the location where an impulse sequence occurs may be measured using predetermined calculation means by measuring the absolute delay time between the first arriving time of the impulse sequence and the detection time of the digital output signal obtained by the comparator 250 using temporal calibration. Furthermore, since a propagation channel for an impulse signal varies over time, the error of the absolute time can be reduced by performing periodic temporal calibration.

Here, temporal calibration may be performed by placing an impulse transmitter (for example, a tag) at a location to which the distance is accurately known and calculating the propagation time of an impulse signal (a reference propagation time) using a server for performing wireless location. The propagation distance of the impulse signal may be calculated using the difference with the propagation time measured based on the reference propagation time.

Figure 4A:
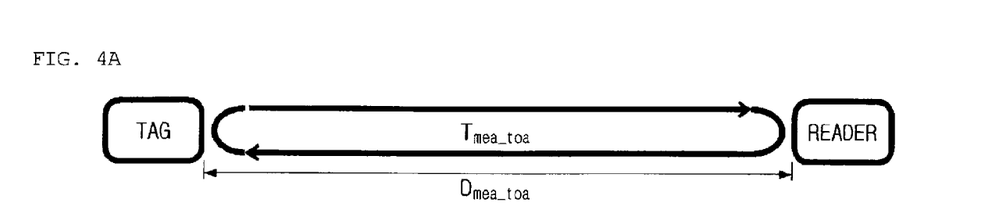
FIG. 4A is a drawing illustrating ranging using a Time of Arrival (TOA) method.
Figure 4B:
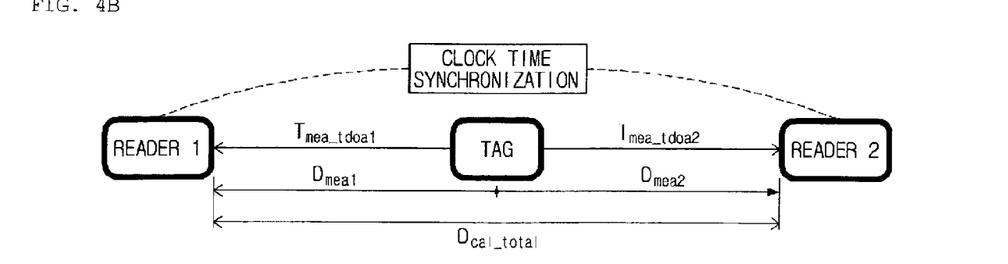
FIG. 4B is a drawing illustrating ranging using a TDOA method.

For example, the propagation distance of the impulse signal may be calculated by temporal calibration based on a Time of Arrival (TOA) method shown in FIG. 4A or a Time Difference of Arrival (TDOA) method shown in FIG. 4B. As shown in FIGS. 4A and 4B, an impulse transmitter (for example, a tag) is installed at a predetermined distance and a server can calculate the propagation distance of an impulse signal using temporal calibration based on the corresponding impulse received by a reader for performing wireless location. A tag may be installed at the middle of two readers.

Referring to FIG. 4A, in the case of ranging based on a TOA method, the propagation distance $D_{mea\_toa}$ of an impulse signal to be obtained may be calculated using Equation 1. In Equation 1, $T_{cal\_toa}$ is impulse round-trip time between the tag and the reader for receiving an impulse during calibration, $D_{cal\_toa}$ is the distance between the tag and the reader for receiving an impulse during calibration, and $T_{mea\_toa}$ is actually measured impulse round-trip time between the tag and the reader for receiving an impulse (corresponding to the propagation time or arrival time of the impulse calculated by the signal processing base-band unit).

$$D_{mea\_toa} = (T_{mea\_toa} - T_{cal\_toa}) \times c/2 + D_{cal\_toa}, (c=3\times 10^8 \text{ m/sec}) \quad (1)$$

Referring to FIG. 4B, in the case of ranging using a TDOA method, the propagation distances $D_{mea\_tdoa1}$ (the propagation distance from a tag to a first reader) and $D_{mea\_tdoa2}$ (the propagation distance from a tag to a second reader) of an impulse signal to be obtained may be calculated using Equation 2. In Equation 2, $\Delta T_{cal\_tdoa}$ is the difference in absolute time between the arrival time of an impulse from a tag to one reader and the arrival time of the impulse from the tag to the other reader during calibration, $D_{cal\_total}$ is the distance between the two readers during calibration, $T_{mea\_tdoa1}$ is the time when the first reader (reader 1) detects the impulse from the tag (corresponding to the propagation time or arrival time of the impulse calculated by the signal processing base-band unit), $T_{mea\_tdoa2}$ is the time when the second reader (reader 2) detects the impulse from the tag (corresponding to the propagation time or arrival time of the impulse calculated by the signal processing base-band unit), $D_{mea\_tdoa1}$ is the distance between the tag to the first reader (reader 1), and $D_{mea\_tdoa2}$ is the distance from the tag to the second reader (reader 2). Here, it is assumed that the clock time of the first reader and the clock time of the second reader have been synchronized.

$$D_{mea\_tdoa1} = (D_{cal\_total} + \Delta D_{mea\_tdoa})/2$$

$$D_{mea\_tdoa2} = (D_{cal\_total} - \Delta D_{mea\_tdoa})/2$$

$$\Delta D_{mea\_tdoa} = D_{mea\_tdoa1} - D_{mea\_tdoa2} = (-\Delta T_{cal\_tdoa} + (T_{mea\_tdoa1} - T_{mea\_tdoa2})) \times c, (c=3\times 10^8 \text{ m/sec})$$

$$D_{cal\_total} = D_{mea\_tdoa1} + D_{mea\_tdoa2} \quad (2)$$

Meanwhile, a widely used existing method is to find the peak value of an envelope or the peak value of a first arriving pulse. This method is disadvantageous in that in order to find the peak value of a first arriving pulse, the high-resolution high-speed ADC must be used and the configuration of the digital signal processing base-band unit is very complicated. However, in the detection method according to the present invention, unless the first received part of an impulse sequence received in a multipath fading environment is rapidly changed or an impulse propagation channel is rapidly changed over time, the initial part of the detected signal has a uniform leading edge. Furthermore, the location detected by the comparator 250 also has a specific temporal interval with respect to the first arriving pulse. That is, the detection method according to the present invention is configured to detect a first arriving pulse or the leading edge of the envelope of low-level input signals input after the first arriving pulse signal, the detected location of a pulse may be made to have a uniform time difference with respect to the arrival time of the first pulse, unless the propagation channel varies rapidly.

In the case where the envelope is detected, the envelope information of received impulse signals connected to first arriving pulse information is used, so that excellent characteristics are expected to be achieved in a multipath fading environment.

Figure 5A:
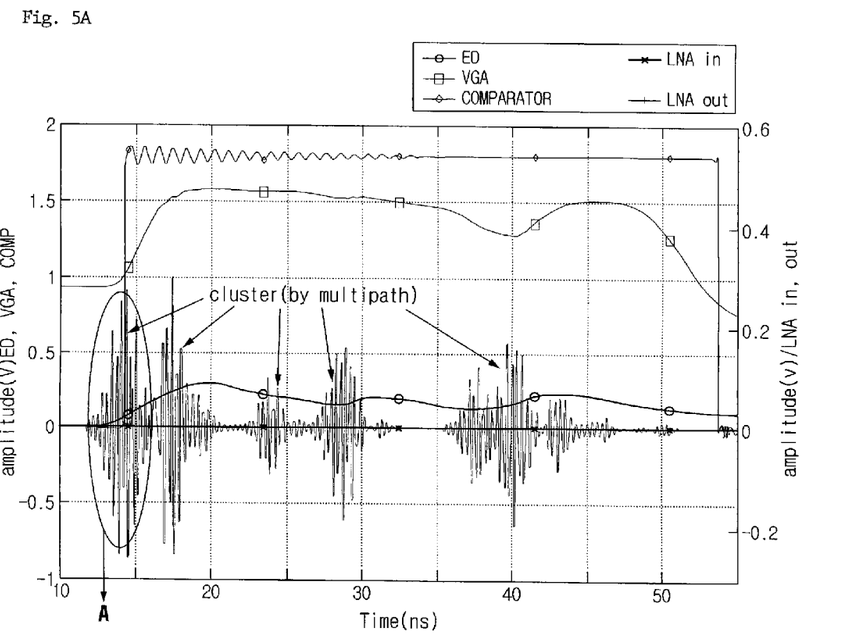
FIG. 5A is a waveform diagram illustrating the functionality of each element of RF/analog unit 200 and the detection of an impulse signal based on the functionality, with respect to an input signal received in a multipath fading environment.
Figure 5B:
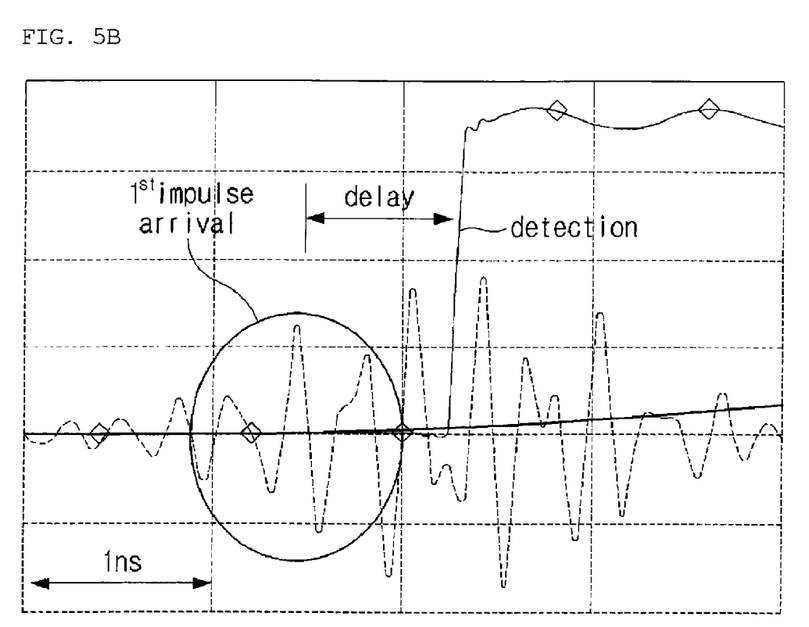
FIG. 5B is an enlarged waveform diagram of region A of FIG. 5A.

FIG. 5A is a waveform diagram illustrating the functionality of each element of RF/analog unit 200 and the detection of an impulse signal based on the functionality, with respect to an input signal received in a multipath fading environment. FIG. 5B is an enlarged waveform diagram of region A of FIG. 5A.

In FIG. 5A, reference character "LNA in" denotes the input signal of the low-noise amplifier 210, that is, the output signal of the band-pass filter 100, and reference character "LNA out" denotes the output signal of the low-noise amplifier 210. Reference characters "ED" denotes the output signal of the envelope detector 220, reference character "VGA" denotes the output signal of the variable gain amplifier 230, and reference character "COMPARATOR" denotes the output signal of the comparator 250. The left Y-axis values denote the impulse signal LNA in input to the low-noise amplifier 210 and the signal LNA out amplified using the low-noise amplifier 210. Since a signal present before amplification is much smaller than an amplified signal, the former signal seems to be a rectilinear line as shown in FIG. 5A. Furthermore, the amplified impulse signal is not a single impulse signal such as that shown in FIG. 3, but includes a string of impulse signals in the form of an impulse sequence. The magnitude of a continuous impulse sequence may be increased or decreased by destructive interference or constructive interference. Accordingly, the impulse signals appear in clusters, as shown in FIG. 5A.

Figure 6A:
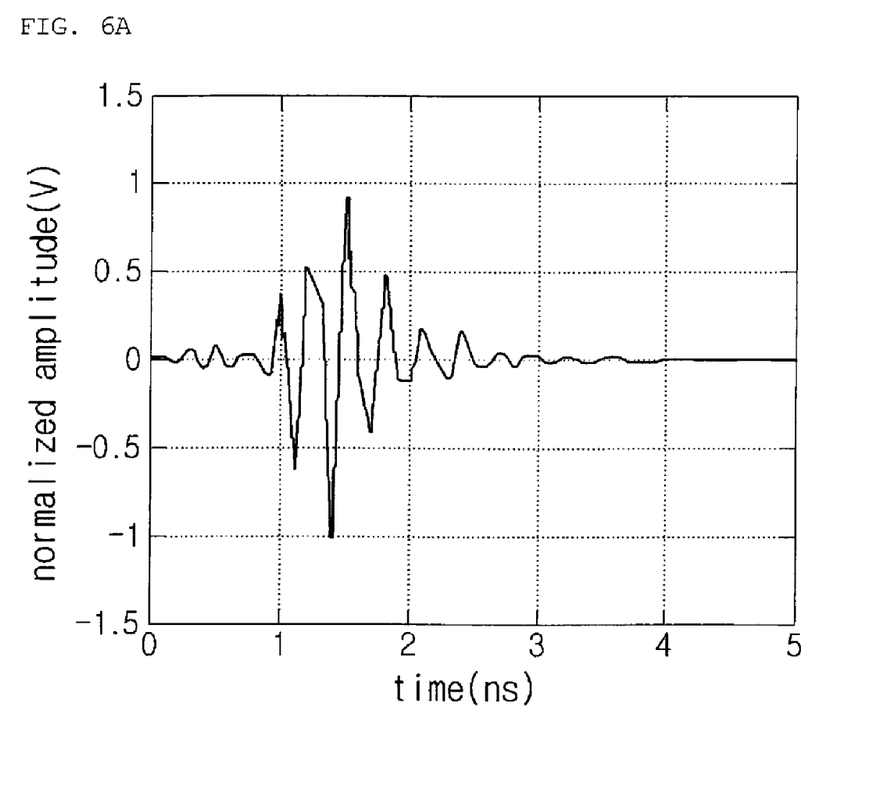
FIG. 6A is a waveform diagram illustrating a band-passed impulse signal used in the present invention.

In order to create a virtual input signal used for the simulation of FIGS. 5A and 5B, a single transmission impulse signal, such as that shown in FIG. 6A, is used.

Figure 6B:
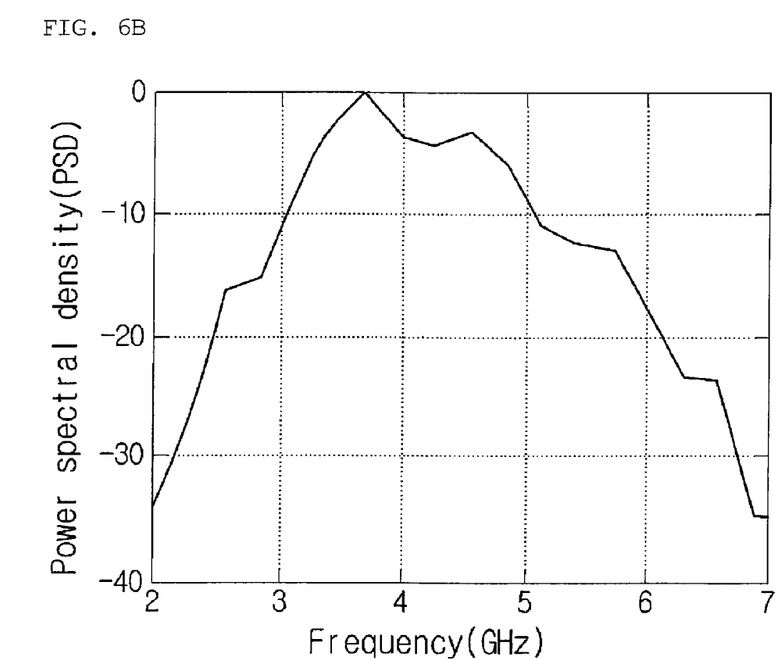
FIG. 6B is a waveform diagram illustrating the normalized power density function Of the impulse signal shown in FIG. 6A.

FIG. 6A is a waveform diagram illustrating a band-passed impulse signal used in the present invention. FIG. 6B is a waveform diagram illustrating the normalized power density function of the impulse signal shown in FIG. 6A.

Referring to FIG. 6A, the impulse signal used in the present invention has a pulse width equal to or narrower than 1 ns.

Furthermore, data about a propagation channel model for a residential LOS environment which belongs to channel models (A. F. Molisch et al., IEEE 802.15.4A channel Model-Final report Tech. Rep. Doc. IEEE 802.15-04-0662-04-004A, 2005.) proposed by the IEEE 802.15.4A standardization group was used. From this modeling data, it can be seen that in a multipath fading environment, the propagation characteristics of impulse signals are lower than those of multipath fading signals to which a first arrival impulse signal is connected.

As illustrated in FIG. 3, the envelope signal of received pulse sequence signals amplified by the wideband variable gain amplifier 230 is restored to a digital signal by the comparator 250. As seen from FIGS. 5A and 5B, in the case of a multipath fading environment, a received signal has an impulse sequence form, an envelope-detected and amplified signal also has a wide temporal interval, and a restored digital pulse signal has an interval of about 40 ns.

However, as in the case of a single pulse, a first received impulse signal, a detected square pulse and a time delay are present. Compared to a single pulse, there is a difference in delay time. The reason for this is that the reference voltage level of the comparator 250 is set to a lower value. However, in most cases, the reference voltage level of the comparator 250 does not change greatly after time delay calibration, so that delay time has a uniform value during ranging. Accordingly, when the impulse wave propagation channel changes frequently, the reliability of the system can be improved by periodically performing time delay calibration, as shown in FIG. 4A or 4B.

Figure 7:
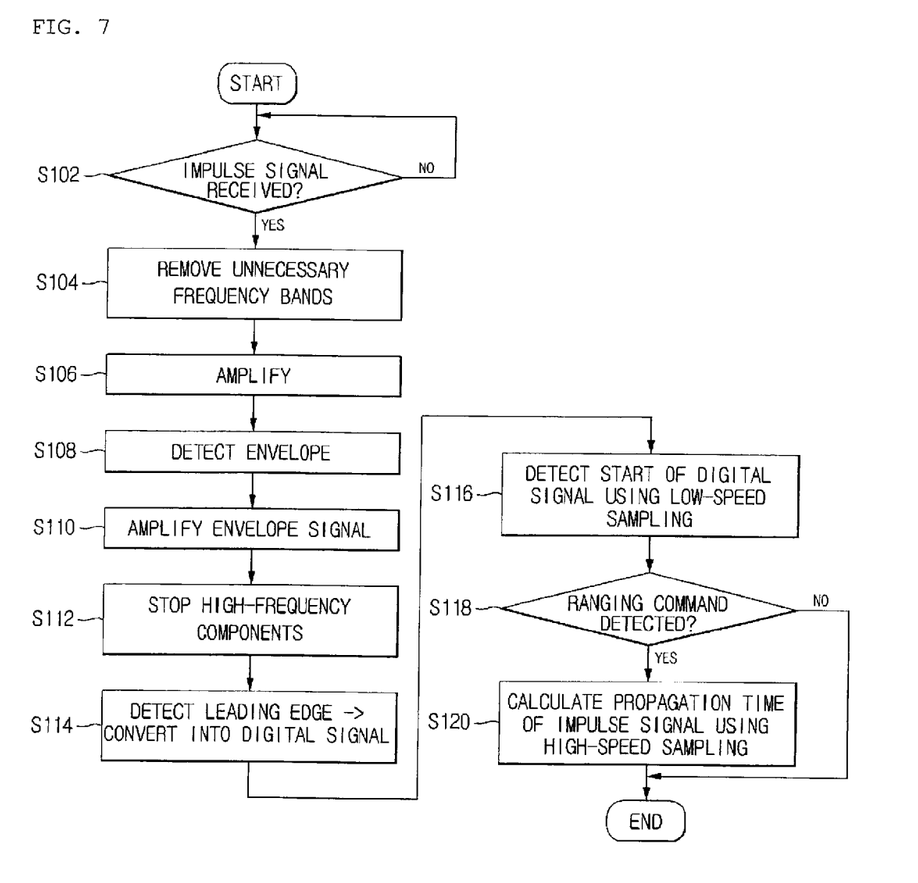
FIG. 7 is a flowchart illustrating a method of calculating the propagation time of an impulse signal according to the present invention.

FIG. 7 is a flowchart illustrating a method of calculating the propagation time of an impulse signal according to the present invention.

Referring to FIG. 7, whether an impulse signal or an impulse sequence has been received is checked at step S102. As the impulse signal is received, unnecessary frequency bands are removed at step S104.

Thereafter, the impulse signal from which unnecessary frequency bands have been removed is amplified at step S106, the envelope of the amplified impulse sequence is detected at step S108, and the detected envelope signal is amplified at step S110.

While the impulse sequence is detected and then the envelope signal is detected, the high-frequency components of impulsive noises added at the envelope signal are stopped at step S112, and the leading edge of the envelope signal, the high-frequency components of which have been stopped, is detected and then converted into a digital signal (or a square pulse) at step S114.

Thereafter, the start of the digital signal is detected using low-speed sampling at step S116. Information about symbol restoration, packet (frame) information and the presence of ranging can be acquired by detecting only the presence of a digital pulse through the detection of the start of the digital signal.

Thereafter, whether a ranging command has been detected or frame synchronization has been found is checked at step S118. If a ranging command has been detected or frame synchronization has been found, the propagation time of an impulse signal (the arrival time of the impulse signal) is calculated using high-speed sampling at step S120.

Accordingly, as illustrated in FIG. 4A or 4B, the absolute delay time between the arrival time of an impulse signal and the detection time of a digital signal can be measured by predetermined calculation means using a TOA or TDOA method, and the distance to a location where an impulse signal occurred (the propagation distance of the impulse signal) may be calculated at high resolution.

Figure 8:
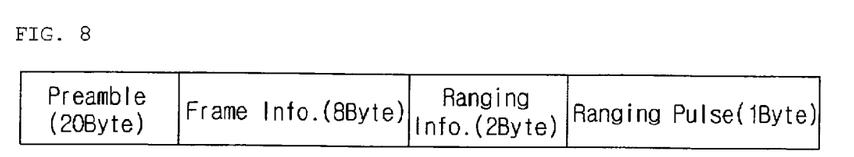
FIG. 8 shows the configuration of a physical layer header used for ranging.

FIG. 8 shows the configuration of a physical layer header used for ranging.

Referring to FIG. 8, a physical layer header includes a preamble, frame info indicating the start of a frame, ranging info including a command to perform ranging, and a ranging interval related to the performance of ranging.

Figure 9A:
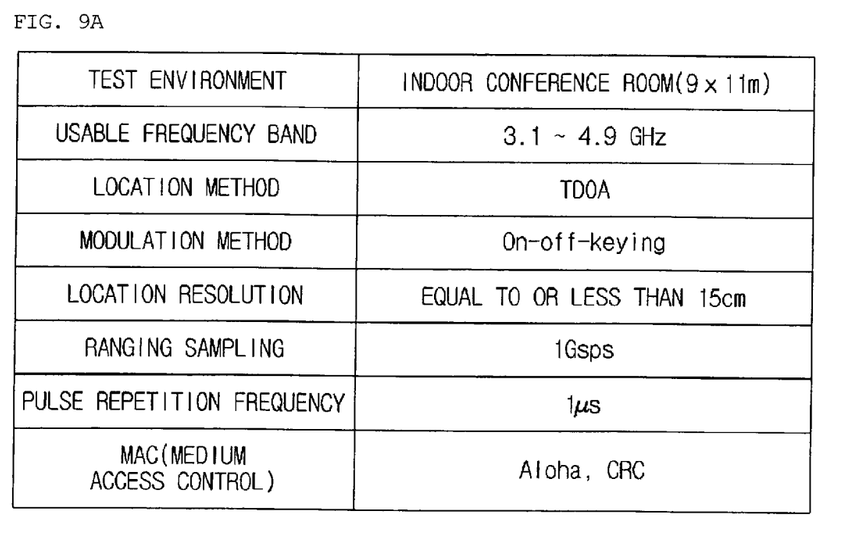
FIG. 9A is a table illustrating a measurement environment and specification information so as to perform location in an indoor environment using the method according to the present invention.
Figure 9B:
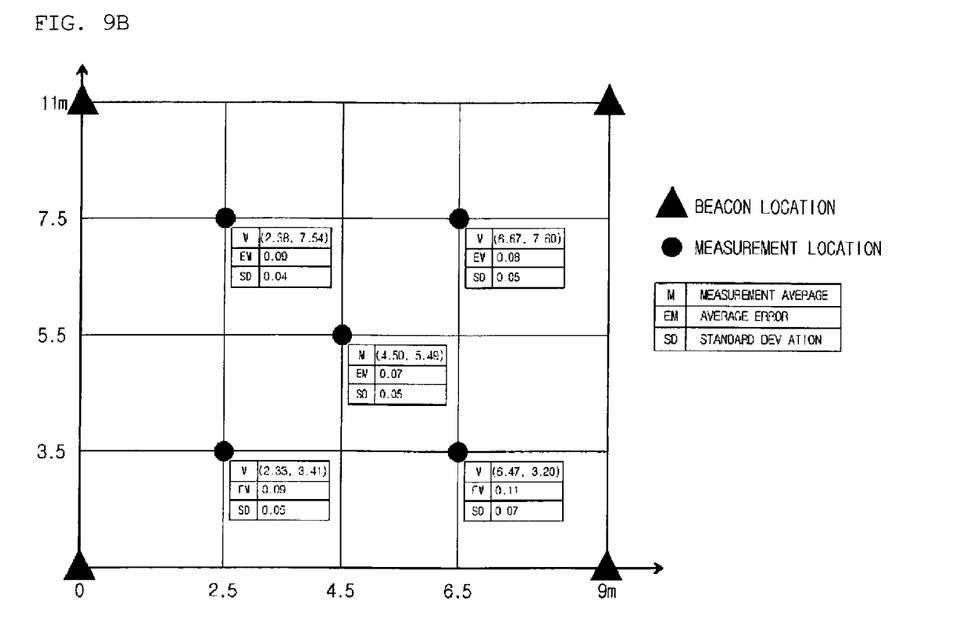
FIG. 9B is a graph showing the results of the performance of location in an indoor environment using the method according to the present invention.

FIG. 9A is a table illustrating a measurement environment and specification information so as to perform location in an indoor environment using the method according to the present invention, and FIG. 9B is a graph showing the results of the performance of location in an indoor environment using the method according to the present invention. In order to evaluate the performance of location, values measured at known locations within a measurement environment are compared with each other. With regard to the number of measurements, a packet is sent to each location 3,000 times, results are actually measured and averaged, and a standard deviation is obtained.

Referring to FIG. 9A, a test environment was an indoor conference room having a size of 9×11 m, a usable frequency band ranged from 3.1 to 4.9 GHz, and a location method was based on Time Difference of Arrival (TDOA). On-off keying was used as a modulation method, location resolution was equal to or lower than 30 cm, the sampling speed of the high-speed sampler for ranging was 1 Gbps, and pulse repetition frequency was 1 μs ($10^{-6}$ sec).

From FIG. 9B, it can be seen that the location system according to the present invention has average location capability equal to or lower than 11 cm. That is, it can be seen that the case where an impulse signal is used is very excellent in real-time location application having error lower than tens of cm in a multipath fading environment.

Here, although the method of calculating the distance to a location where an impulse signal occurred by calculating the absolute delay time between the arrival time of the impulse signal and the detection time of a digital signal acquired by the comparator 250 using temporal calibration based on a TDOA method as shown in FIG. 4B has been described, the distance to the location where the impulse signal occurred can be calculated using a TOA method at high resolution in a similar manner, as shown in FIG. 4A.

As described above, the scheme according to the present invention is configured to detect an input impulse signal using the analog unit, and does not directly sample an input impulse signal or does not require a separate high-resolution wideband ADC to process a digital signal.

In particular, the scheme according to the present invention does not find the accurate arrival locations of received pulses to detect the received pulses, but detects the presence of impulse signals by detecting the envelope of a received pulse sequence and triggering a level equal to or higher than a predetermined level. Furthermore, since the response time of the envelope detector is slower than that of an input pulse, and includes the characteristics of an input pulse sequence. However, the detection of an impulse signal enables the propagation time of the impulse signal to be calculated by detecting an arrival time delayed by a predetermined amount without detecting the accurate arrival time of the impulse signal.

Furthermore, since a ranging block is separate from the signal processing base-band unit, which is a digital unit, power consumption can be minimized and the complexity of the ranging digital unit can be reduced.

By using this principle and algorithm, a circuit which has performance similar to that achieved by an impulse signal detection system using a complicated ADC device can be easily implemented.

The impulse signal-based wireless ranging system and method using the configuration and algorithm according to the present invention enables integration to be easily achieved and, thus, considerably reduces the cost of a location system, thereby allowing the system to be widely used in a variety of application fields. In particular, the impulse signal-based wireless ranging system and method according to the present invention may be used in variety of fields, such as a system for location for the safety of workers (for example, in a shipbuilding yard, an iron mill, or a large-scale assembly factory), a service for patient location in a hospital and the management of expensive equipment and assets in a hospital, the management of visitors and security facilities, a system for the management of visitors and shopping carts in a large discount store/large department store, and the tracking of the locations of specimens and test objects in a laboratory.

The apparatus for detecting an impulse signal and the wireless ranging method using the apparatus are configured to detect the leading edge of an envelope without finding the peak value of an envelope or the peak value of a first arriving pulse, so that a separate high-speed wideband ADC and complicated configurations for controlling the ADC and processing data are not necessary. In particular, as a signal detected by the RF/analog unit is a digital signal, the start location of a resulting digital pulse can be simply detected using various methods in the base band. The complexity of the system can be improved by detecting the envelope of a received signal oj envelope and storing a digital signal without directly sampling a several nano second (the frequency band is several GHz or wider) impulse signal and calculating wireless distance (ranging). Furthermore, in order to perform ranging, the 1-bit high-speed digital sampler (high-speed clock) is used to detect the accurate location of a resulting digital signal, and the output of the high-speed digital sampler can be processed in a parallel manner, thereby reducing the complexity of the system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting a start time point of an impulse signal or an impulse sequence to realize wireless real-time location system application in a multipath fading environment, comprising:
   a band-pass filter for removing unnecessary frequency bands from ultra-short impulse signals received through a receiving antenna;
   a Radio Frequency (RF) analog unit for detecting an envelope signal of the impulse sequence deprived of the unnecessary frequency bands and based on the multipath fading environment, and outputting a digital signal regarding the envelope signal based on a leading edge of the envelope signal; and
   a signal processing base-band unit for performing low-speed 1-bit sampling and then outputting data, and, if a frame synchronization has been found or a ranging command has been detected, performing high-speed 1-bit sampling and then calculating and outputting propagation time of the impulse signals.

2. The apparatus as set forth in claim 1, wherein the RF analog unit comprises:
   a low-noise amplifier (LNA) for amplifying the impulse sequence received in the multipath fading environment;
   an envelope detector for detecting the envelope signal from the amplified impulse sequence;
   a variable gain amplifier for amplifying the envelope signal; and
   a comparator for detecting the leading edge of the amplified envelope signal and converting the amplified envelope signal into a digital pulse.

3. The apparatus as set forth in claim 2, wherein the comparator compares the amplified envelope signal with a reference voltage and outputs a digital signal regarding part of the envelope signal above the reference voltage.

4. The apparatus as set forth in claim 3, wherein the reference voltage is variable.

5. The apparatus as set forth in claim 2, wherein the apparatus further comprises a plurality of comparators having different reference voltages between a minimum voltage and a maximum voltage, and each of the comparators compares the amplified envelope signal with a corresponding reference voltage and outputs a digital signal regarding the amplified envelope signal; and
   wherein if the comparators do not output the digital signal when the amplified envelope signal is lower than the minimum voltage or higher than the maximum voltage, the LNA gain and the variable gain amplifier are adjusted using predetermined control means.

6. The apparatus as set forth in claim 2, further comprising an integrator disposed between the variable gain amplifier and the comparator.

7. The apparatus as set forth in claim 6, wherein the integrator removes impulse-type noise and performs signal amplification and makes the duration of the envelope signal wider.

8. The apparatus as set forth in claim 1, wherein the signal processing base-band unit comprises:
   a low-speed signal processing unit for detecting presence of a digital pulse; and a high-speed signal processing unit for detecting detection timing of the digital pulse.

9. The apparatus as set forth in claim 8, wherein the low-speed signal processing unit comprises:
a low-speed sampler for sampling the digital signal at low speed;
a symbol synchronizer for synchronizing symbols of the digital signal sampled by the low-speed sampler; and
a frame synchronizer for synchronizing the symbols synchronized by the symbol synchronizer for each frame and then detecting the presence of the digital pulse.

10. The apparatus as set forth in claim 8, wherein the high-speed signal processing unit comprises:
a high-speed sampler for sampling the digital signal in response to a frame synchronization signal provided by a frame synchronizer; and
a ranging pulse detector for detecting a ranging pulse from pulses sampled by the high-speed sampler.

11. The apparatus as set forth in claim 10, wherein the high-speed sampler comprises:
a clock signal divider for dividing a predetermined clock signal;
a flip-flop for receiving pulses from the RF/analog unit, and outputting pulses in synchronization with clock signals provided by the clock signal divider;
a register for outputting pulses out of the flip-flop; and
a parallel signal processor for, in response to the clock signals output from the clock signal divider, sampling the pulse signals provided by the register and then detecting the ranging pulse.

12. The apparatus as set forth in claim 11, wherein the register receives the pulses from the flip-flop in a serial manner, and outputs pulses in a parallel manner.

13. A method of detecting an impulse signal or an impulse sequence to realize wireless real-time location system application in a multipath fading environment, comprising:
checking whether the impulse signal or the impulse sequence has been received, and, if it has been received, removing unnecessary frequency bands therefrom;
amplifying the impulse sequence deprived of the unnecessary frequency bands;
detecting and amplifying an envelope of the amplified impulse sequence;
detecting a leading edge of the envelope and converting information about the leading edge into a digital signal;
detecting a start of the digital signal using low-speed sampling; and
if a ranging command has been detected or a frame synchronization has been found, calculating a propagation time of the impulse signals using high-speed sampling.

14. The method as set forth in claim 13, further comprising stopping high-frequency components of impulsive noises added to the envelope in detecting and amplifying the envelope.

15. The method as set forth in claim 13, further comprising:
measuring an absolute delay time between arrival time of the impulse signal or the impulse sequence and detection time of the digital signal using a temporal calibration based on a Time of Arrival (TOA) or a Time Difference of Arrival (TDOA) method; and
calculating a propagation distance to a location where the impulse signal or the impulse sequence occurred.

16. The method as set forth in claim 15, wherein the temporal calibration is performed periodically.

17. The method as set forth in claim 15, wherein the temporal calibration based on the TOA method is performed by receiving impulses from a tag at a predetermined distance using a reader, and calculating the propagation distance of the impulse signal using Equation $D_{mea\_toa}=(T_{mea\_toa}-T_{cal\_toa})\times c/2+D_{cal\_toa}$, ($c=3\times10^8$ m/sec), where $T_{cal\_toa}$ is impulse round-trip time between the tag and the reader during calibration, $D_{cal\_toa}$ is distance between the tag and the reader during calibration, and $T_{mea\_toa}$ is measured impulse round-trip time between the tag and the reader.

18. The method as set forth in claim 15, wherein the temporal calibration based on the TDOA method is performed by receiving impulses from a tag at the middle of first reader and second reader and calculating $D_{mea\_tdoa1}$ and $D_{mea\_tdoa2}$ using the following Equations:

$$D_{mea\_tdoa1}=(D_{cal\_total}+\Delta D_{mea\_tdoa})/2$$

$$D_{mea\_tdoa2}=(D_{cal\_total}-\Delta D_{mea\_tdoa})/2$$

$$\Delta D_{mea\_tdoa}=D_{mea\_tdoa1}-D_{mea\_tdoa2}=(-\Delta T_{cal\_tdoa}+(T_{mea\_tdoa1}-T_{mea\_tdoa2}))\times c, (c=3\times10^8 \text{ msec})$$

$$D_{cal\_total}=D_{mea\_tdoa1}+D_{mea\_tdoa2}$$

where $\Delta T_{cal\_tdoa}$ is a difference in absolute time between the arrival time of the impulse from the tag to the first reader and the arrival time of the impulse from the tag to the second reader during calibration, $D_{eal\_total}$ is distance between the first and second readers during calibration, $T_{mea\_tdoa1}$ is time when the first reader detects the impulse from the tag, $T_{mea\_tdoa2}$ is time when the second reader detects the impulse from the tag, $D_{mea\_tdoa1}$ is distance between the tag to the first reader, and $D_{mea\_tdoa2}$ is distance from the tag to the second reader.

* * * * *